Sept. 9, 1924.   1,508,228
T. P. KIRKPATRICK
SYSTEM OF COOLING DYNAMO ELECTRIC MACHINES
Filed May 17, 1920    2 Sheets-Sheet 1

WITNESSES:
H. J. Shelhamer
H. C. Lowe

INVENTOR
Thomas P. Kirkpatrick
BY
Wesley G. Carr
ATTORNEY

Sept. 9, 1924.

T. P. KIRKPATRICK 1,508,228

SYSTEM OF COOLING DYNAMO ELECTRIC MACHINES

Filed May 17, 1920　　2 Sheets-Sheet 2

WITNESSES:
H.J. Shelhamer
H.C. Lowe

INVENTOR
Thomas P. Kirkpatrick
BY
Wesley G. Carr
ATTORNEY

Patented Sept. 9, 1924.

1,508,228

UNITED STATES PATENT OFFICE.

THOMAS P. KIRKPATRICK, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF COOLING DYNAMO-ELECTRIC MACHINES.

Application filed May 17, 1920. Serial No. 381,953.

*To all whom it may concern:*

Be it known that I, THOMAS P. KIRKPATRICK, a citizen of the United States, and a resident of Wilkinsburg, in the county of Allegheny and State of Pennsylvania, have invented a new and useful Improvement in Systems of Cooling Dynamo-Electric Machines, of which the following is a specification.

My invention relates to the ventilation of dynamo-electric machines and it has particular relation to a system of the character designated that is adapted for use in an electric motor operating in a vacuum, such, for example, as a motor for actuating a ship's gyroscope.

The object of my invention is to provide a motor of simple design which shall prevent over-heating of a dynamo-electric machine operating within a vacuum, which shall be relatively simple and inexpensive to manufacture, and which shall be of durable construction.

Heretofore it has been customary to cool motors by circulating air through channels therein. However, in machines operating within a vacuum, this is, of course, impossible. By my invention, I provide means for cooling a motor which operates in a vacuum. Briefly speaking, my invention consists in providing an annular chamber in the stator-frame of the motor through which circulating water is forced for cooling the frame. The stator winding is bent against the frame and the space between the winding and the frame is filled with gum or other heat-conducting material to conduct the heat from the winding to the frame. End plates composed of non-magnetic material are employed for diminishing and leakage fluxes and for securing better heat conduction.

Figure 1:
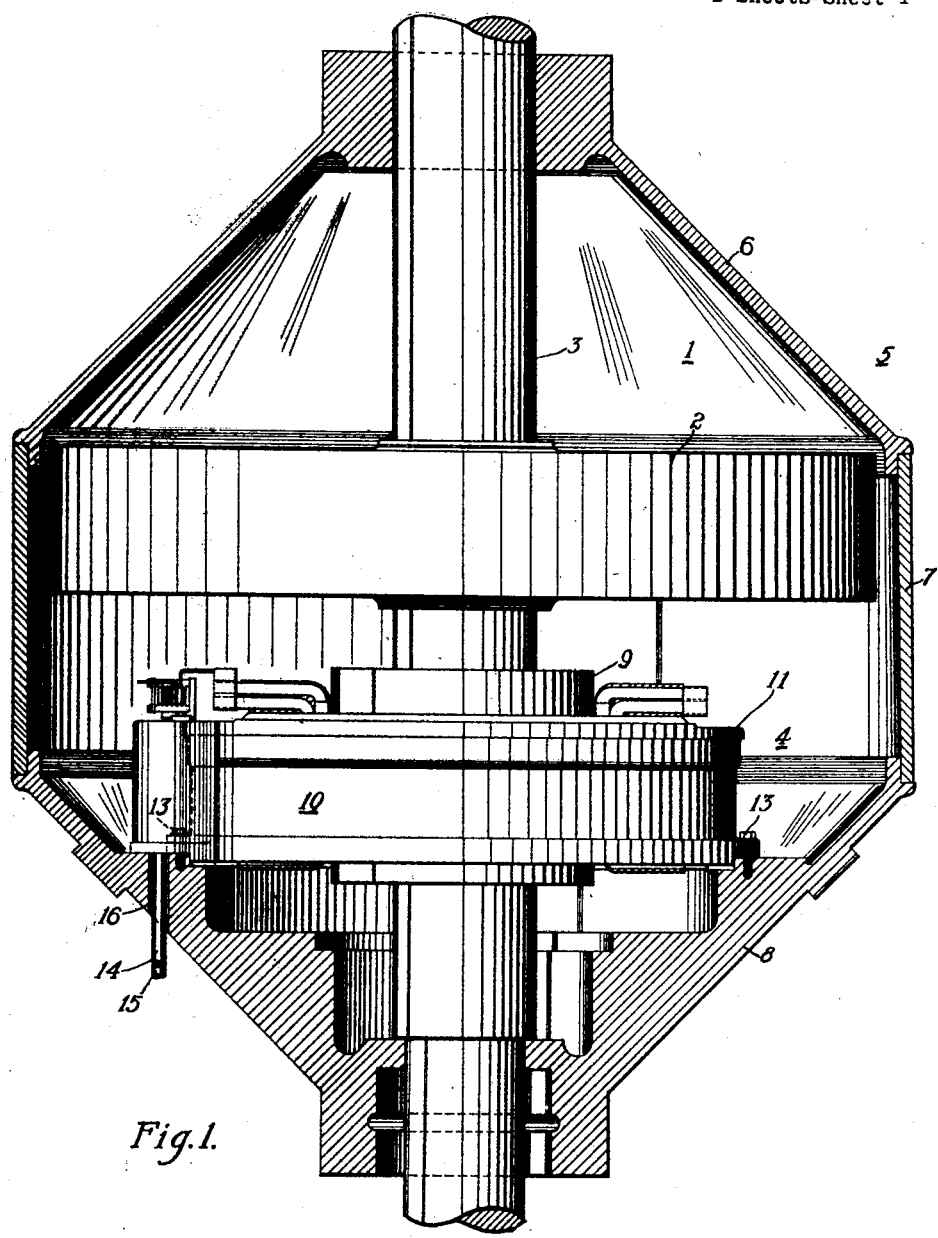
Figure 2:
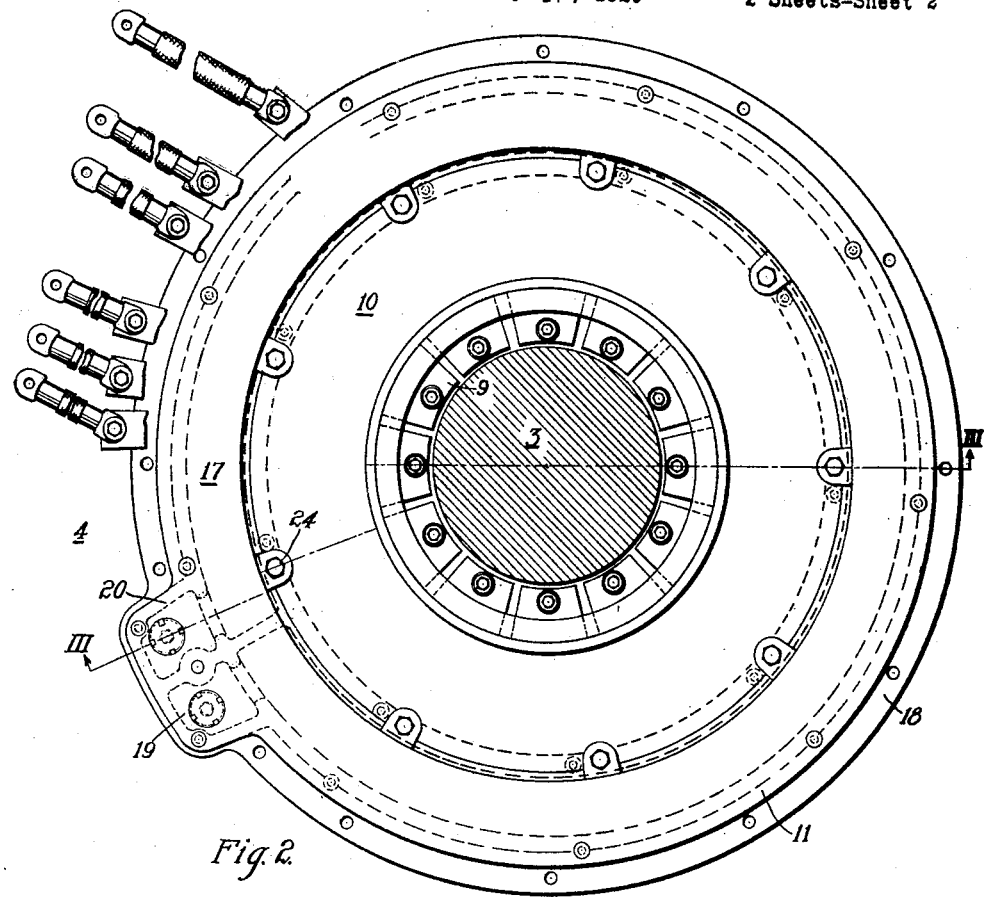
Figure 3:
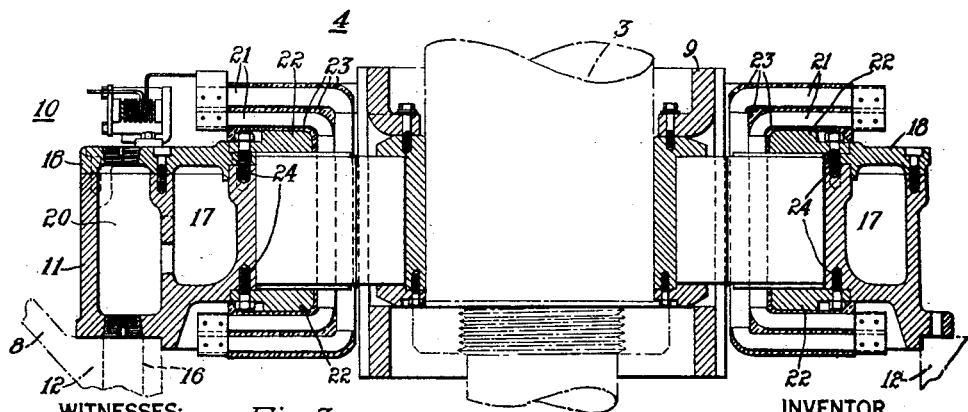

A better understanding of my invention may be had by referring to the accompanying drawings, of which Fig. 1 is a view, partially in side elevation and partly in section, of a gyroscope and a driving motor therefor enclosed in an air-tight case and embodying my invention. Fig. 2 is an enlarged plan view of the motor shown in Fig. 1, the primary winding being omitted for the sake of clearness. Fig. 3 is a sectional view of the motor shown in Figs. 1 and 2, taken along the line III—III of Fig. 2.

Referring particularly to Fig. 1, a gyroscope 1 comprises a fly-wheel 2 mounted on a shaft 3 that is driven by a motor 4. The gyroscope 1 and the driving motor 4 are both enclosed within an air-tight casing member 5. The casing 5 comprises an upper, a central and a lower member 6, 7 and 8, respectively. The motor 4 comprises a rotor 9, a stator 10 and frame 11, the latter of which is mounted on an annular ledge 12 of the casing 5 by means of tap bolts 13.

Cooling water is circulated through the frame 11 of the stator 10 by means of inlet and outlet pipes 14 and 15, respectively, which enter the casing 5 through an opening 16 provided therein.

Referring to Figs. 2 and 3, the frame 11 of the stator 10 is provided with an annular chamber 17 through which is circulated a cooling fluid, such, for example, as water. A plate 18, constituting the upper portion of the field frame and a cover for the chamber 17, is provided to avoid the necessity of employing a single casting of difficult construction. An inlet and outlet chamber 19 and 20, respectively, at one side of the casing are in communication with the annular chamber 17 and with the inlet and the outlet pipes 14 and 15, respectively.

A stator winding 21 of the motor 4 is bent into proximity to end plates 22. The winding 21 is covered by, and the space between the winding 21 and the end plate 22 is filled with, a body of gum 23 or other suitable insulating heat-conducting material such as "Stirling" varnish, which adheres to the end plates 22 and aids in conducting heat from the winding to the end plates. The gum 23 is preferably applied in successive layers, each layer being baked prior to the application of the next succeeding layer. By this method, the end turns of the windings 21 are actually embedded in a solid mass of electrically insulating and heat-conducting material which is internally associated with the end plates 22. The end plates 22 are made of some non-magnetic material which is a good conductor of heat, such, for example, as brass, and are secured to the frame 11 and the cover plate 18 by means of bolts 24. The end plates 22 conduct the heat to the frame 11 and the cover member 18, both of which form a portion of the walls of the water chamber 17.

Water for cooling the motor 4 is supplied from some external source, not shown, through the pipe 14, shown in Fig. 1, and the inlet chamber 19 into the annular chamber 17. After the water has circulated through the chamber 17, it is discharged through the outlet chamber 20 and the outlet pipe 15. If it is desired, a cooling system may be installed whereby the water is cooled and again passed through the machine, thereby effecting a saving of water.

When the motor 4 is in operation, the primary winding 21 becomes heated and, as the motor is in a vacuum, the heat would soon injure the winding if it were not conducted through the insulating gum 23 to the end plates 22 to the frame 11 and the cover plate 18. The circulation of water through the chamber 17 carries the heat away from the frame 11 and the cover plate 18.

From the foregoing description, it will be obvious to those skilled in the art that my invention provides means for effectively cooling a motor operating in a vacuum and that apparatus constructed in accordance therewith is relatively inexpensive to manufacture and strong and durable in construction.

While I have shown my invention in its preferred form, I do not desire to be limited thereto, but rather to be limited by the spirit and scope of the appended claims.

I claim as my invention:—

1. In a dynamo-electric machine, the combination with a stator frame having a chamber therein and provided with a winding having end turns provided with insulating means thereon, of end plates of non-magnetic material associated in heat-conducting relation with said frame, said end turns being bent into close proximity to said plates with said insulating means contacting with both said turns and said plates, and means for conducting a cooling fluid through said chamber.

2. A dynamo-electric machine, adapted to operate in a vacuum, comprising a stator member, a frame therefor having a chamber therein for the circulation of a cooling medium therethrough, a winding carried by said stator having the end turns thereof bent into close proximity to said frame and the walls of said chamber, electrically insulating and heat conducting material covering said windings and adhering to said frame, to facilitate the conduction of heat from said windings to said frame and non-magnetic means disposed between said end turns and said frame.

3. The combination with a dynamo-electric machine operating in a vacuum and comprising a stator frame having a winding mounted thereon and a chamber therein, of a separate casing enclosing said motor and provided with an opening in communication with said chamber, end plates of non-magnetic material attached to said frame, the end turns of said winding being bent into proximity to said end plates, means adhering to said conductors and plates for insulating said winding and conducting the heat therefrom to said plates, and means for conducting water to said chamber in the stator frame and the openings in the enclosing case.

In testimony whereof, I have hereunto subscribed my name this 30th day of April, 1920.

THOMAS P. KIRKPATRICK.